Nov. 7, 1944.  H. SWANSON  2,362,174
VEHICLE HEADLIGHT WITH SEVERAL REMOVABLE FULL-BEAM ELECTRIC LAMPS
Filed March 25, 1943  5 Sheets-Sheet 1

Witnesses:
Florence Hilston
Gustave W. Hilston

Inventor
Harold Swanson

Nov. 7, 1944.  H. SWANSON  2,362,174
VEHICLE HEADLIGHT WITH SEVERAL REMOVABLE FULL-BEAM ELECTRIC LAMPS
Filed March 25, 1943  5 Sheets-Sheet 2
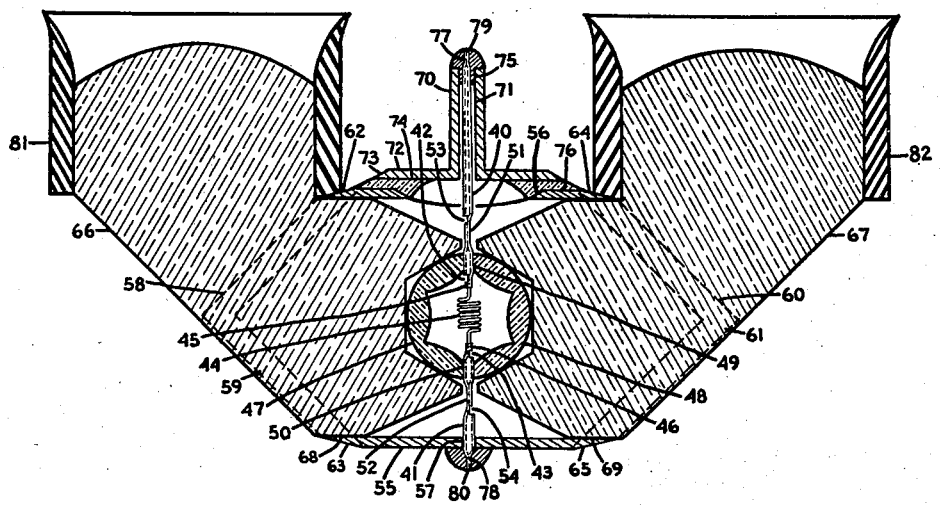
Fig. 3
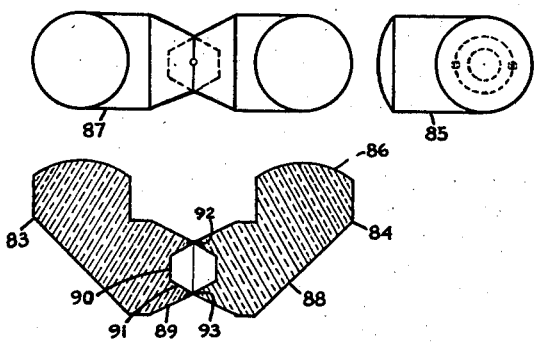
Fig. 4  Fig. 5
Fig. 6
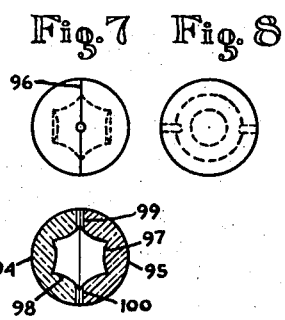
Fig. 7  Fig. 8
Fig. 9
Witnesses:
Florence Hilston
Gustave W. Hilston
Inventor
Harold Swanson Nov. 7, 1944. H. SWANSON 2,362,174
VEHICLE HEADLIGHT WITH SEVERAL REMOVABLE FULL-BEAM ELECTRIC LAMPS
Filed March 25, 1943 5 Sheets-Sheet 3

Witnesses:
Florence Hilston
Gustave W. Hilston

Inventor
Harold Swanson

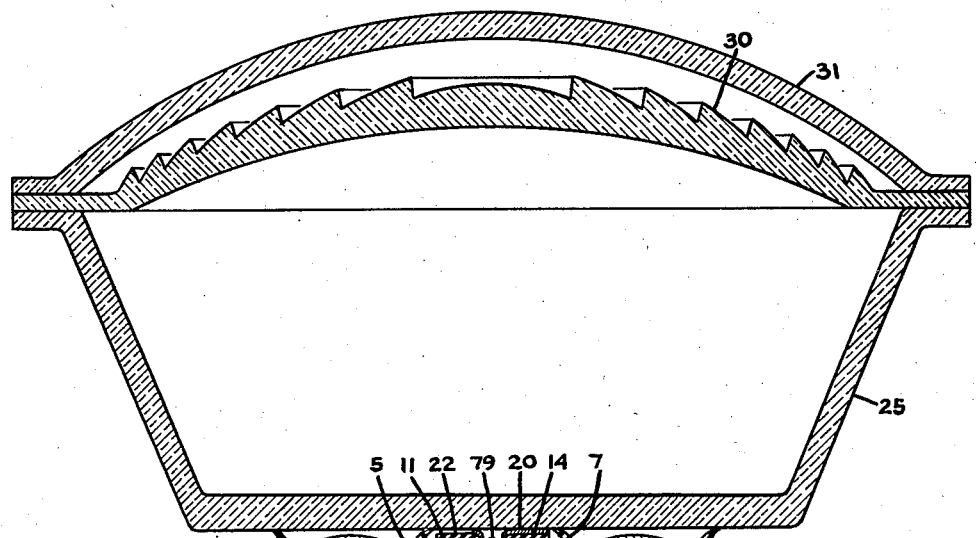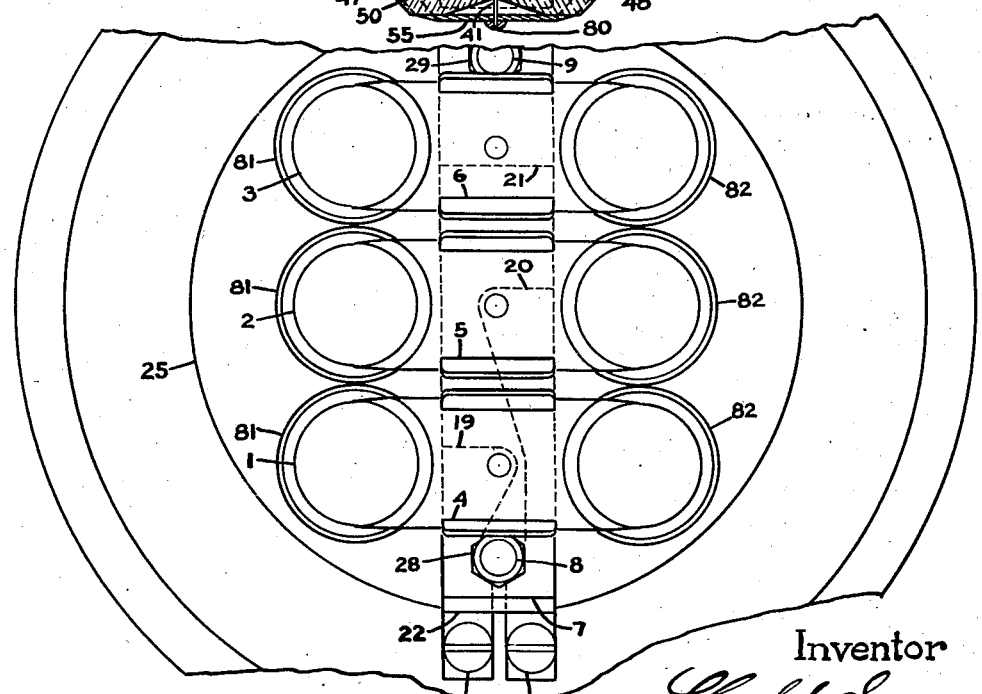

Patented Nov. 7, 1944

2,362,174

UNITED STATES PATENT OFFICE 2,362,174

VEHICLE HEADLIGHT WITH SEVERAL REMOVABLE FULL-BEAM ELECTRIC LAMPS

Harold Swanson, Brownhelm Township, Lorain County, Ohio

Application March 25, 1943, Serial No. 480,423

5 Claims. (Cl. 176—34)

This invention relates to improvements to increase the effective illumination produced by vehicle headlights and similar articles, but more particularly those electric lamps used in automobile headlights which uses focusing type electric lamps.

One object of this invention is to show a practical means of constructing a headlight electric lamp with optical elements that completely surround the lamp's light source and gathering such light produced into a concentrated beam which is projected by means of a headlight lens in a receptacle to the roadway for such vehicle.

A further object is that this application, together with my copending applications Serial Numbers 480,420; 480,421; 480,422; 480,424 and 480,425, filed March, 1943, is a continuation in part of my full-beam electric lamp application Serial Number 402,778, filed July 17, 1941, in which nearly an exact duplicated description of these inventions were originally presented. The feature which is generic to all these inventions is the full-beam refracting element and its adaptation in construction, and operation to gather the light in nearly all directions from a light source into a concentrated beam, as applied to electric lamps; however on account of the present Patent Office regulations restricting the limitations presented in a single application, it was necessary to segregate these applications.

A further object is to show that certain improvements set forth in my original application Serial Number 744,598, filed Sept. 18, 1934, and subsequently continued through the following: Patent Number 2,097,679, patented Nov. 2, 1937, Patent Number 2,137,732, patented Nov. 22, 1938, Patent Number 2,154,542, patented April 18, 1939, Patent Number 2,222,093, patented Nov. 19, 1940, are adaptable to make vehicle headlight full-beam electric lamps and similar articles.

A further object is that this invention is a continuation in part of my earlier inventions mentioned in the preceding paragraph, in respect to where any improvements or subject matter of my earlier inventions can be used to advantage with the improvements of this invention, particularly the use of hollow metal wires and their many features which are described in the previous applications or patents and in this application.

A further object is that many features or improvements used in connection with my copending applications, previously referred to, can be used to advantage with this application, particularly the full-beam refracting elements and the many cross combinations possible by their substitution herein.

Other objects of this invention will appear more fully described and illustrated hereinafter.

Fig. 3 is an enlarged sectional view of an individual vehicle headlight full-beam electric lamp.

Fig. 4 to Fig. 6 are elevational and sectional views of the full-beam refracting elements for a vehicle headlight full-beam electric lamp.

Fig. 7 to Fig. 9 are elevational and sectional views of the inner full-beam refracting elements for a vehicle headlight full-beam electric lamp.

Fig. 12 is a sectional view of the vehicle headlight rotated ninety degrees (90°) from the view in Fig. 1.

Fig. 13 is a plan view of the three full-beam electric lamps mounted to the vehicle headlight in projection from the view in Fig. 12.

Figure 1:
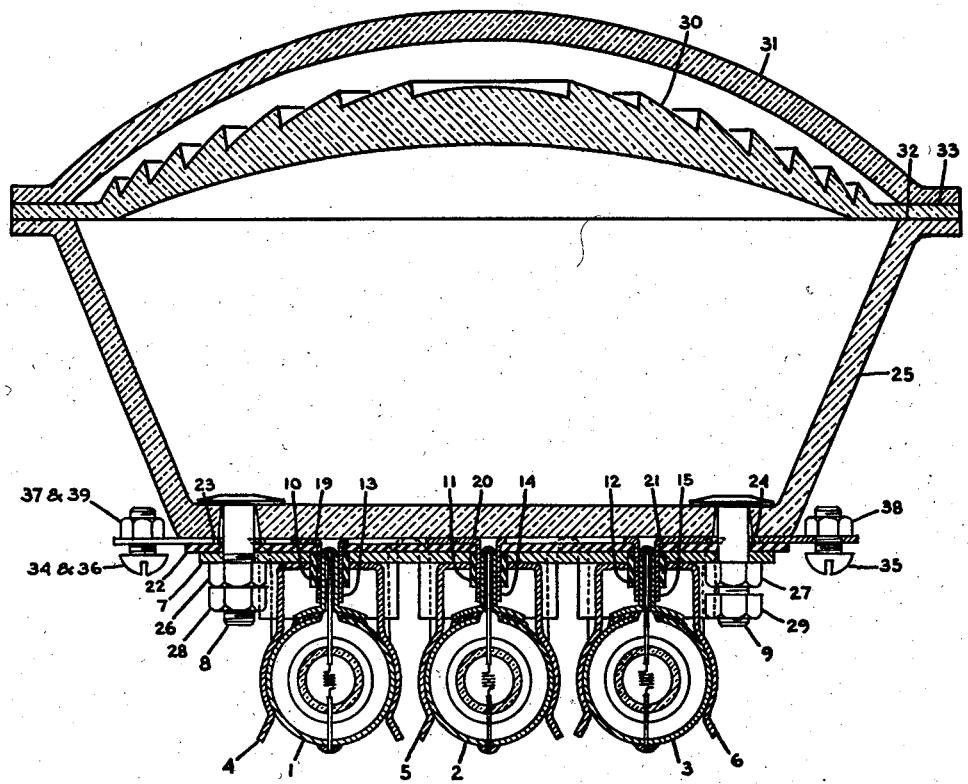
Fig. 1 is a sectional view of three full-beam electric lamps adapted to vehicle headlight use.
Figure 2:
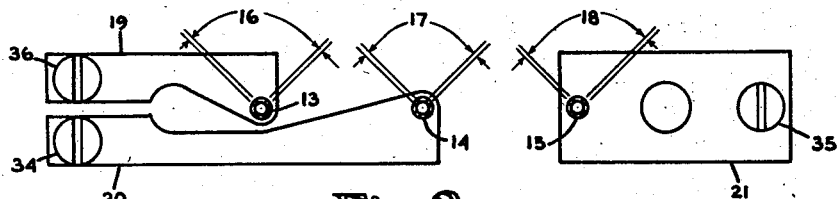
Fig. 2 is a plan view of the external contacts of the device in Fig. 1.

Referring to Fig. 1 which is a sectional view of a vehicle headlight receptacle with three vehicle headlight full-beam electric lamps therein; having three individual vehicle headlight full-beam electric lamps 1, 2, and 3 (see Fig. 3 for details), with each lamp having its filament designed respectively for, a near or passing beam, a far or rural driving beam, and a parking or twilight driving beam; the lamps 1, 2, and 3 are held in place by three socket clasps respectively 4, 5, and 6 each of which are made to the same width as part 21 in Fig. 2, from a strip of sheet spring bronze, being formed to the shape and perforated as shown, and then soldered or spot-welded to a brass or copper strip 7 which is also the same width as part 21 and is perforated with holes to fit the screws 8 and 9, and the bushings 10, 11, and 12; the center contact plungers (see Fig. 3 part 70) of each lamp 1, 2, and 3 are encased by three brass tubular sockets 13, 14, and 15 that are each slotted lengthwise to ½ or ¾ of their length by slots in Fig. 2 at 16, 17, and 18, forming two or more prongs in each socket, which are bent slightly inward to insure contact against the lamp plungers; the sockets 13, 14, and 15, can be made as individual pieces and soldered, brazed, or spot-welded to the brass center contact connectors 19, 20, and 21, or they can be formed and perforated from the same sheet of brass as shown here; an insulating strip 22, being the same width as part 21 in Fig. 2 with insulating washers 23 and 24, and insulating bushings 10, 11, and 12, can be made individually from rubber or any other suitable moulded plastic as shown here, or they can be all moulded as one piece if desired; a glass automobile headlight bowl 25 of circular cross-section as shown, having two holes into which are cemented with rubber cement, or any other suitable cement, two brass screws 8 and 9 each formed with a thin flanged head as shown, and fitted with brass hexagonal nuts 26, 27, 28, and 29 respectively; the center contact connectors 19, 20, and 21 are coated on their under surfaces with a film of rubber cement, or any other suitable cement, to act as a gasket in contact with the glass bowl 25; then the insulating strip 22, with washers 23 and 24, and the copper strip 7 together with clasps 4, 5, and 6, and bushings 10, 11, and 12, are all placed over the connectors 19, 20, and 21, and screws 8 and 9, being securely fastened in place by tightening nuts 26 and 27 carefully so as not to fracture the glass bowl 25; a glass prismatic lens 30 and a glass cover 31, both of circular cross-section as shown, are coated all around the flanged surfaces at 32 and 33 with a film of suitable cement, or glass fusing material and (or without coating if desired) hermetically sealed by glass fusion, or cemented with the bowl 25 at 32 and 33; then the lamps 1, 2, and 3, are forced into the clasps 4, 5, and 6, and sockets 13, 14, and 15, with the dust rings (see Fig. 3 and Fig. 12, parts 81 and 82) pressing against the bottom of the bowl 25; the extra hexagonal nuts 28 and 29, together with the brass screws 34, 35, and 36, and their respective brass hexagonal nuts 37, 38, and 39 fastened to the connectors 19, 20, and 21, are provided for connecting with the electric supply lines.

In Fig. 1, the space provided between the hexagonal nuts 27 and 29 on bolt 9, is for attaching an electrical supply line connection which serves as the ground or common connection for all of the lamps by making electric contact with hexagonal nut 27, thence to strip 7, thence to clasps 4, 5, and 6, and thence to the lamp base 55 (see Figs. 3 and Fig. 12) of each lamp 1, 2, and 3. The spaces provided between the heads of the screws 34, 35, and 36, and connectors 19, 20, and 21 respectively, are for attaching the other electrical supply line connections which serves to make electrical contact respectively with connectors 19, 20, or 21, thence to sockets 13, 14, or 15, and thence to the center plunger 70 (see Fig. 3) on each of the lamps 1, 2, or 3.

The lamps 1, 2, and 3, are lighted electrically in parallel circuit, to light, individually, in a pair or all together. Lamp 1 is lighted with electrical supply lines connecting on bolt 9 and screw 36; lamp 2 is lighted with electrical supply lines connecting on bolt 9 and screw 34; and lamp 3 is lighted with electrical supply lines connecting on bolt 9 and screw 35.

Referring to Fig. 2 which is a plan view of the center contact socket connectors 19, 20, and 21, showing how each is constructed to connect with the lamps 1, 2, and 3 in Fig. 1 and Fig. 13.

Referring to Fig. 3 which is an enlarged sectional view of a vehicle headlight full-beam electric lamp; having two hollow metal wires 40 and 41 being the lead-in wires with notched openings cut through the walls at 32 and 43; the ends of a coiled electric lamp filament 44 being inserted into the ends of the hollow metal wires 40 and 41 which are clamped or spot-welded together at 45 and 46 to form the filament mount; two hemispherical refracting elements 47 and 48 (see Fig. 7 to Fig. 9 for details) being made from heat resisting glass, are coated on their junction surfaces with a film of suitable glass fusing material, into which the filament mount is positioned, enclosed, and hermetically sealed by glass fusion at 49 and 50 to form the inner full-beam refracting element assembly, which is exhausted to a vacuum, or exhausted and filled with an inert gas, at either low or high pressures, through the hollow metal wires 40 and 41 which are swaged or flattened to form the preliminary seals at 51 and 52 and later electric welded, or otherwise closed air tight, after which the notched openings are cut through the walls at 53 and 54; the inner full-beam refracting element assembly is inserted into a thin wall metal tube 55, that serves as the electric lamp base, through a large countersunk feathered edge hole at 56, in alignment with the small hole at 57, and soldered together with the hollow metal wire 41 at 57; the metal tube 55 is made of copper with mitered form fitting ends 58, 59, 60, and 61 that are beveled to a feathered edge at 62, 63, 64, and 65 to facilitate hermetic sealing; two outer half full-beam refracting elements 66 and 67 (see Fig. 4 to Fig. 6 for details) being made from heat resisting glass, are coated with a film of suitable glass fusing material encircling them at 68 and 69, and hermetically sealed by glass fusion with the metal tube 55; a copper contact socket plunger 70 having a hole at 71 and a thin flange 72 that is beveled to a feathered edge at 73, then coated and fused with a thick film of suitable glass fusing material at 74 for insulation and hermetic sealing purposes, and is slipped over and soldered with the hollow metal wire 40 at 75, and hermetically sealed by glass fusion with the metal tube 55 at 56, 76, and 74; then the lamp is exhausted to a vacuum, or exhausted and filled with an inert gas (argon) or heat dissipating gas (hydrogen), at either low or high pressures, up to a safe working pressure, through the hollow metal wires 40 and 41 which are swaged or flattened and cut off to form the preliminary seals at 77 and 78; later the final seals at 79 and 80 are made by soldering, brazing, electric welding, or otherwise closing the ends air tight; the soft rubber dust rings 81 and 82 are forced over the ends of the outer full-beam refracting elements 66 and 67 spanning parts 4, 5, or 6, and 7, and 19, 20, or 21, and 22 in Fig. 1 to make a dust tight contact with the glass surface of bowl 25 in Fig. 1 and Fig. 12. The metal tube 55, or the plunger 70, can be made from any suitable metal that will hermetically seal with glass; several such types of metals are now known; one being an alloy of approximately 45% nickel with 55% iron, which is formed to its finished shape and finally copper plated to facilitate hermetic sealing with glass; another type of metal is stainless steel having from 27 to 30% chromium.

In Fig. 3, when the inner full-beam refracting element assembly is sealed air tight, the metal tube 55, and the plunger 70 can be cemented in place so as to be dust tight without being actually air tight, thereby eliminating exhaust operations as atmospheric air is enclosed therein; also the metal from which parts 55 and 70 are made, can be any other suitable metal such as brass, which is difficult to hermetically seal with glass.

Another feature of the lamp in Fig. 3, is that the inner full-beam refracting element assembly can be made without exhausting and sealing independently as previously described, but rather exhausted and sealed simultaneously with the lamp through the hollow metal wires 40 and 41, and finally sealed only at 79 and 80 without flattening and sealing at 51 and 52. This feature would also permit the refracting elements 47 and 48 to be held slightly free in place as shown without being hermetically sealed together.

Referring to Fig. 4 to Fig. 6 collectively which shows the refracting elements for a vehicle headlight full-beam electric lamp; having two half full-beam refracting elements 83 and 84 being made from heat resisting glass; each element 83 or 84 having a cylindrical boss 85 with its end formed into a convex lens surface at 86, and being miter joined to a cylindrical body 87, both of which are mitered to form a 90° (approximate) prism light reflecting surface at 88; the end of the cylindrical body 87 is a cone frustum whose flanks form a 120° (approximate) prism light reflecting surface at 89 for light-rays radiating from the center of the light source chamber; the inner end of the cylindrical body 87 is recessed into a light source chamber with cone frustum surfaces at 90 and 91; lead-in wire grooves are formed at 92 and 93. Elements 83 and 84 are constructed around the equatorial axis and the polar axis.

Referring to Fig. 7 to Fig. 9 collectively which shows enlarged views of the inner refracting elements for a full-beam electric lamp; having two half full-beam refracting elements 94 and 95 each being a hemisphere made from heat resisting glass and fitting together on their center line junction surfaces at 96; each element 94 or 95 having a light source chamber which is formed into a small convex lens surface at 97 with the other inner surfaces at 98 formed into a cone frustum whose flanks are shaped to a convex lens cross-section; lead-in wire grooves are formed at 99 and 100. Elements 94 and 95 are constructed around the equatorial axis.

Whenever the words "equatorial axis" or "polar axis" are used herein, like in the two preceding paragraphs, they are intended to have the same meaning as qualified in optics with coordinates in or about revolution such as the two axes of a ninety-degree (90°) reflecting prism.

Figure 10:
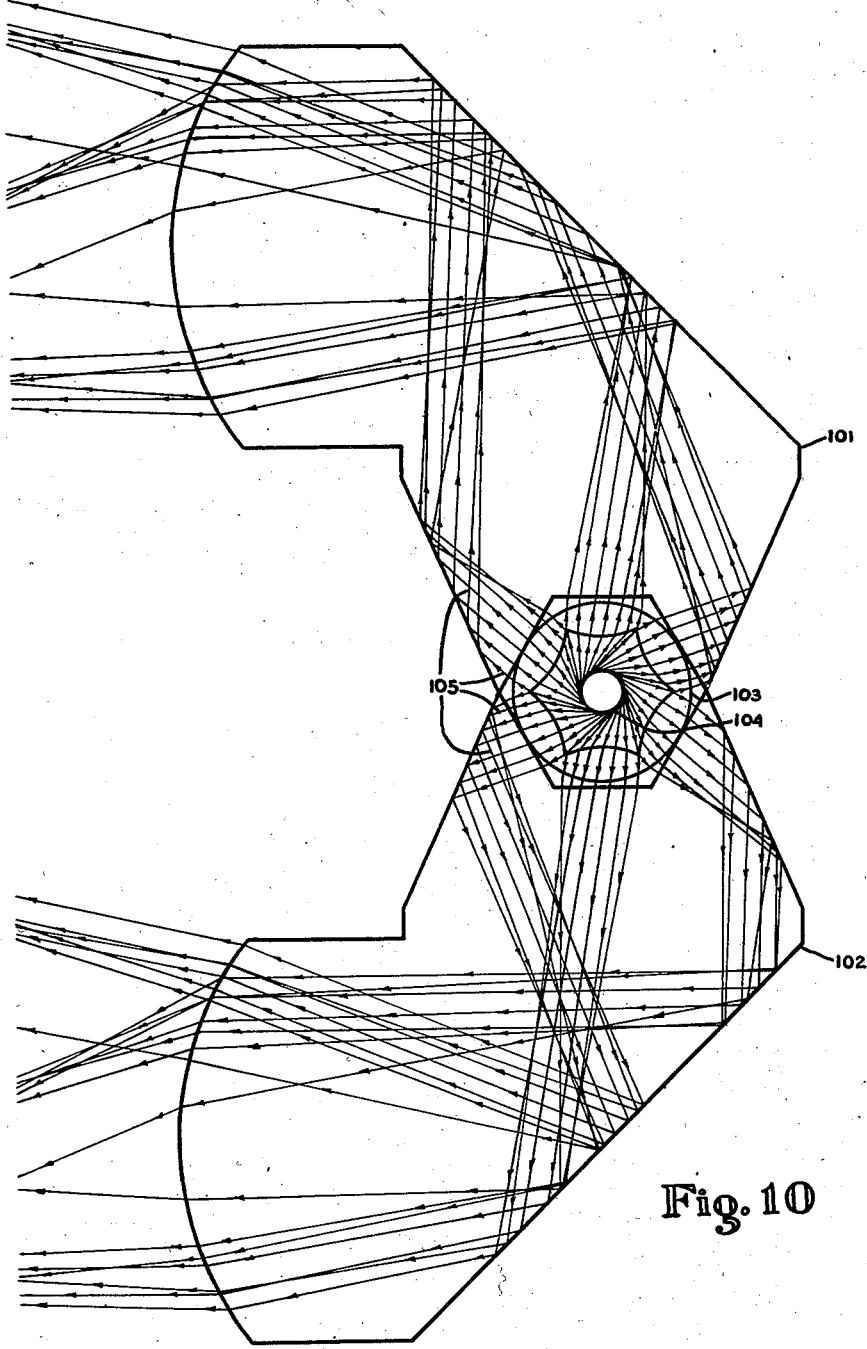
Fig. 10 and Fig. 11 are enlarged light propagation diagrammatic views of the full-beam refracting elements for a vehicle headlight full-beam electric lamp.
Figure 11:
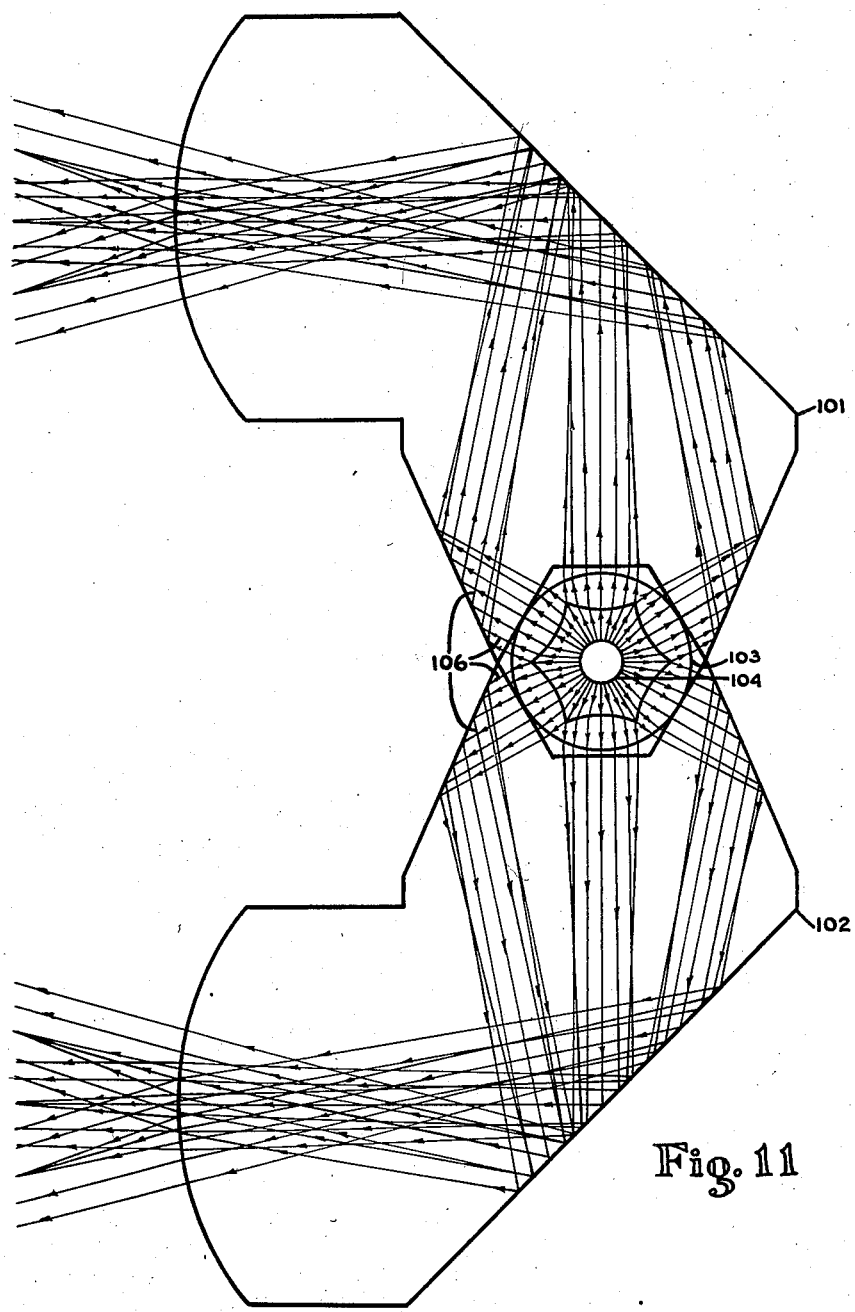

Before proceeding to describe Fig. 10 and Fig. 11, it might be well to state that these illustrations represent only one set of diagrams. The set of diagrams are for the same light source and full-beam refracting elements, which have the same identifying numbers in both diagrams. The difference between diagrams of the set being the light-ray lines, which are shown separately in two diagrams, rather than superimposed upon one another in one diagram, thereby avoiding graphic confusion.

In Fig. 10 and Fig. 11, when drawing the light-ray lines in each diagram, the refractive index of one and six-tenths (1.6) was used. This refractive index approximates a sodium D-ray (5893 Angstroms) in medium silicate flint glass. This refractive index would make a critical angle of thirty-eight degrees and forty-two minutes (38° 42') for glass to air refraction, and any light-ray whose angle of incidence exceeds the critical angle, would refract back into the glass like reflection on a back surfaced mirror (a common looking glass); however inasmuch as all reflecting surfaces can be mirror coated, the critical angle limits can be disregarded in these diagrams. By keeping in mind that each arrowed line in the diagrams represents the approximate path of a light-ray, and that other light-rays approximately parallel to these lines are also propagating with them, then these diagrams are self-explanatory merely showing the paths of the light-rays.

Referring to Fig. 10 and Fig. 11 which are enlarged diagrammatic views showing the light propagation within a vehicle headlight full-beam electric lamp; having the outer full-beam refracting elements 101 and 102 (similar to elements 66 and 67 in Fig. 3) surrounding the inner full-beam refracting element 103 (similar to elements 47 and 48 in Fig. 3) which encloses the light source 104. In Fig. 10, the light-rays are shown by arrowed lines 105 (several dozen shown) radiating from tangent surface points of the light source 104. In Fig. 11, the light-rays are shown by arrowed lines 106 (several dozen shown) radiating from surface points at the center of the light source 104. Lines 105 illustrate the propagation of light-rays radiating from points on one extreme edge of the light source 104 in clockwise fashion, and when viewed within a mirror, they appear from the other extreme edge in counter-clockwise fashion; while lines 106 illustrate light-rays from the center or half way between these two extremes; then it is obvious that light-rays from any other point on the light source 104, would propagate on lines somewhere between lines 105 and 106. Light radiating from the light source 104 emerges from elements 101 and 102 in two conical beams which blend into a single conical beam a few feet distant from the lamp.

Referring to Fig. 12 which is a sectional view of the vehicle headlight rotated ninety degrees (90°) from the view in Fig. 1, having the parts identified by the same numbers as shown in Fig. 1 and Fig. 3.

Referring to Fig. 13 which is a plan view of the three full-beam electric lamps mounted to the vehicle headlight in projection from the view in Fig. 12, having the parts identified by the same numbers as shown in Fig. 1, Fig. 2 and Fig. 3.

In Fig. 1 and Fig. 12 the lens 30 is shown merely illustrative to designate how a headlight lens can be incorporated into the device. While lens 30 is of the circular prismatic type, it should not be indicative of an ideal arrangement, for there are many other types of lenses which are much better suited for actual service in vehicle headlights, but would be more difficult to illustrate by a simple cross-sectional view in the drawings as shown here. Each type of headlight lens has advantages for its particular use or service, and no doubt that many of the present designed lenses could not be adapted to this vehicle headlight economically because the light from the full-beam electric lamps 1, 2, and 3 is divided between two beams (see Fig. 10 and Fig. 11). On account of the two light beams from each of the lamps 1, 2, and 3, the best suited headlight lens for this device would have two areas dividing the entire lens in halves, whereby each area functioned as an individual lens in focal alignment with its respective light beams from lamps 1, 2, and 3. In some cases to obtain certain desired results from the vehicle headlight, the lens 30 is entirely eliminated and the cover 31 has its inner surface formed into a lens, or is left plain as shown and attached directly on the bowl 25, or a double faced mirrored partition is fastened vertically in Fig. 12 at the center within bowl 25.

Each of the individual vehicle headlight full-beam electric lamps 1, 2, and 3, in Fig. 1, is used independently from each other. This feature has the advantage over multiple filaments in one lamp, as each lamp can be replaced independently when it burns out. The following illustrates such advantage: most automobile driving is done within twenty-five (25) miles of the owner's home; therefore, rural drivers use the far driving beam the most because rural roads are usually unlighted; city drivers use the near driving beam the most because the streets are usually lighted by street lights; and the drivers who park their automobiles in the highways all night long, use the parking light the most. To most of these drivers the psychological effect of throwing away a lamp which can still be used for the other beams, proves to be a source of dissatisfaction when the new lamp is purchased. Now with an automobile headlight as shown in Fig. 1, replacement is more in harmony with the drivers' ideas; and at the same time being better engineered to throw more light in front of the automobile in areas where the light is needed the most, with less light on the sides where not needed. Also the replacement of lamps 1, 2, or 3, is less expensive than in those lamps which have the lamp, reflector, and headlight lens all together in a single unit which can only be replaced as a combined unit.

The parking lamp in Fig. 1, can have its ends (see Fig. 6, at 86) frosted to diffuse the light, which makes an ideal light source for the large headlight lens (Fig. 1, part 30), so as to be without glare and still having the large headlight appearance; this combination would give ample light with only a one watt lamp.

In Fig. 1 it is also obvious that all of the individual vehicle headlight full-beam electric lamps 1, 2, and 3, can be made with the same type of filament in each i. e. all lamps are the same or alike; also the lamps can be all lighted together which will make an abundance of light projected from the large headlight lens (Fig. 1, part 30) upon the roadway when the lamps have filaments to their maximum wattage capacity, such as aeroplane landing headlights.

Whenever the words "refracting element" or "full-beam refracting element" or "inner full-beam refracting element" or "outer full-beam refracting element" or the plural "elements" in place of "element" with said words, are used herein, they are intended to mean the refracting elements shown and described herein, or in my copending applications Serial Numbers 480,420; 480,421; 480,422; 480,424 and 480,425, or any full-beam refracting element which is made with any improvement or feature described herein or therein.

Whenever the words "hollow metal wire" or "high pressure gas" or "hermetically sealed" or "final seal" or "pin-head electric lamp" are herein referred to, they are intended to have the same meaning as described in one or more of the previously mentioned patents (2,097,679; 2,137,732; 2,154,542; 2,222,093) from which this invention is a further development.

Whenever the words "convex lens" or "convex lens shape" or "convex lens cross-section" are used herein to described a curve or surface, they are intended to mean that such curve or surface has a form which resembles a convex lens or a convex lens curve; or any type of lens curve or surface which is corrected optically for spherical and chromatic aberration; or any type of curve or surface which will refract light-rays.

In view of the drawings and preceding description, it is obvious that the improvements of this invention can be used to make many more vehicle headlight full-beam electric lamps, which can be mounted from the rear face of a headlight lens receptacle as shown herein, other than those shown and described herein; therefore in anticipation of the manufacture of such lamps, it is a further object of this invention to extend the claims to include any electric lamp which uses one or more of the improvements described or claimed herein.

I claim:

1. A vehicle headlight with several removable full-beam electric lamps, consisting of, a receptacle of transparent material having a headlight lens cover attached thereto, said receptacle having sockets attached thereto to hold several full-beam electric lamps in focusing alignment with said lens cover, said sockets providing electrical contacts and affording independent removal and insertion for said lamps from each other, said lamps projecting their light through the bottom of said receptacle and thence through said lens cover in predetermined directions.

2. A vehicle headlight full-beam electric lamp, consisting of, an electric lamp filament, lead-in wires connecting to said filament, an inner full-beam refracting element enclosing said filament, an outer full-beam refracting element enclosing said inner element, a metal tube mounting base with an insulated electric contact plunger attached thereto, said base mounted on said outer element, said inner element provided with lens sections to gather light in nearly all directions from said filament and project the light through optical sections provided in said outer element to give the maximum light value in predetermined directions.

3. An outer full-beam refracting element for an electric lamp, consisting of, two optical sections composed of light transmitting material, each of said sections having two cylindrical rods miter joined and beveled at their junction to reflect light-rays from the axis of one rod to the axis of the adjoining rod and formed into a single unit, the end of one rod is formed into a convex lens and the end of the adjoining rod of said unit is recessed into a light source chamber with its outer diameter chamfered to form a prism light reflecting surface for light-rays radiating from the light source chamber, said light source chamber of each optical section formed with light refracting surfaces to gather the maximum light value and project the same in predetermined directions.

4. An inner full-beam refracting element for an electric lamp, consisting of, two hemispheres of light transmitting material matching together on their axial plane to form a sphere, each of said hemispheres having a recessed light source chamber formed therein from the surface of said axial plane, said light source chamber having lens sections arranged to gather light-rays and give the maximum light value in predetermined directions.

5. An inner full-beam refracting element for an electric lamp, consisting of, two bodies composed of light transmitting material, each of said bodies being nearly hemispherical and matching together on their axial plane surfaces to form nearly a sphere, a light source chamber is recessed in each of said bodies from said axial plane surface, said light source chamber arranged with optical refracting surfaces to gather light-rays from near the center of said chamber and project the same to give a maximum light value in predetermined directions.

HAROLD SWANSON.